United States Patent

[11] 3,593,953

| [72] | Inventor | Adolf Auer |
| --- | --- | --- |
| | | Munich, Germany |
| [21] | Appl. No. | 789,696 |
| [22] | Filed | Jan. 8, 1969 |
| [45] | Patented | July 20, 1971 |
| [73] | Assignee | Bremshey & Co. |
| | | Solingen-Ohligs, Germany |

[54] VEHICLE SEATS WITH AIR-SPRING SUPPORTS
7 Claims, 4 Drawing Figs.

[52] U.S. Cl. ................................................. 248/400
[51] Int. Cl. ............................................... F16m 13/00
[50] Field of Search ........................................ 248/376, 399, 400

[56] References Cited
UNITED STATES PATENTS

| 1,305,042 | 5/1919 | White | 248/399 |
| --- | --- | --- | --- |
| 2,821,239 | 1/1958 | Brendel | 248/400 |
| 2,829,703 | 4/1958 | Knoedler | 248/400 |
| 3,100,101 | 8/1963 | Trevaskis | 248/400 |
| 3,150,855 | 9/1964 | Carter et al. | 248/400 |
| 3,203,661 | 8/1965 | Brendel | 248/399 |
| 3,215,386 | 11/1965 | Swenson | 248/400 |
| 3,405,901 | 10/1968 | Gregoire | 248/400 |

OTHER REFERENCES
German printed application, Bremshey & Co., 1,188,960, 3-1965, Cl. 248, sub class 399

Primary Examiner—Edward C. Allen
Attorney—Arthur O. Klein

ABSTRACT: A vehicle seat and a support therefor. The vehicle seat is supported by an air-spring assembly which yields when the driver or a passenger occupies the seat. The air-spring is capable of having its natural frequency adjusted, and this adjustment is brought about by way of swing-lever which is pivotally connected at one end to the frame of the seat and which is directly connected to the air-spring at a location situated at a distance from the pivotal connection to the seat which determines the length of one lever arm. A fulcrum member is shiftable along the swing-lever to a selected location which will determine a second lever arm. The ratio of the first to the second lever arm determines the natural frequency of the air-spring.

VEHICLE SEATS WITH AIR-SPRING SUPPORTS

BACKGROUND OF THE INVENTION

The present invention relates to vehicle seats.

In particular, the present invention relates to springy supports for vehicle seats.

There are known publications, such as prior patents, which illustrate that the broad concept of providing a vehicle seat with an air-spring support is known. However, in actual practice, such structures have never been used. The primary reason for this nonuse of the air-spring type of seat support is that other types of springs have up to recent times been capable of achieving a sufficient degree of travelling comfort in the construction of vehicles such as trucks and other heavy-duty motor vehicles designed to transport substantial loads.

However, in recent times there has been a considerable increase in the requirements to be fulfilled by seats of this type. At the present time when a truck is sold, the manner in which the interior of the cab is equipped has become a matter of major importance and is becoming more and more important. Particularly in the case of freight-hauling vehicles, which must travel day and night, both the driver of such a vehicle and the co-driver who alternates with the driver in operating the vehicle must be protected to the greatest possible extent from excessive fatigue.

The occupants of a vehicle of the above type, or even conventional passenger automobiles which have seats supported by relatively soft springs, become unpleasantly aware of the presence of transverse grooves and lack of evenness in the road, particularly along the right side of a highway. The softness of the spring support is, however, limited inasmuch as the ride qualities transmitted to a passenger or driver and the stiffness of the spring coils are sacrificed for the sake of the softness of the spring. It is particularly with relatively soft springs that the road impacts encountered by the vehicle can be felt through the shock absorbers, so that many drivers stay away from the side of the highway and use the passing lane more than is actually required.

It has therefore become necessary, particularly in the case of seats which are supported by relatively soft springs, to provide with the latter types of structures suitable vibration dampers so that there will necessarily be available, to the operator of the vehicle, the possibility of adjusting the hardness of the spring support structure in a simple way when travelling along roads which are of poor condition and when travelling in the country on unpaved roads.

From a technical vibration standpoint, these latter factors require a natural frequency of a high-quality vehicle seat on smooth superhighways and the like to be approximately one-half the natural frequency required for other highways.

SUMMARY OF THE INVENTION

It is accordingly a primary object of the present invention to provide a vehicle seat construction which will solve the above problems.

In particular, it is an object of the invention to utilize in the solution of the problems set forth above an air-spring type of support for the seat, inasmuch as with an air-spring the natural frequency remains constant irrespective of body weight, if an elevation-adjusting valve is present.

Thus, it is an object of the invention to provide a vehicle seat with an air-spring support the natural frequency of which can be adapted to the road conditions.

A further object of the present invention is to provide a construction of this type which is relatively rugged and simple and which can easily and effectively be adjusted so as to provide a selected natural frequency for the air-spring type of seat-supporting structure.

In particular, it is an object of the invention to provide an adjusting structure of this type which can be easily manipulated so that the adjustment can be carried out manually in order to provide a selected natural frequency for the air-spring.

It is also an object of the invention to provide for a construction of this type an adjusting structure which will enable the static elevation of the seat to be adjusted.

Furthermore, it is an object of the invention to provide a construction which will enable the air-content of the air-spring to be regulated.

In accordance with the invention, the vehicle is provided with a seat which is supported by an air-spring means. An adjusting means coacts with the latter spring means to adjust the natural frequency thereof, and this adjusting means includes an elongated swing-lever pivotally connected at one end to the seat and directly connected with the air-spring means at a location spaced from the pivotal connection to the seat at a distance which determines the length of a first lever arm. The adjusting means includes a device capable of adjusting the position of a fulcrum along the swing lever to determine the length of a second lever arm. The ratio of the first to the second lever arm will determine the natural frequency.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
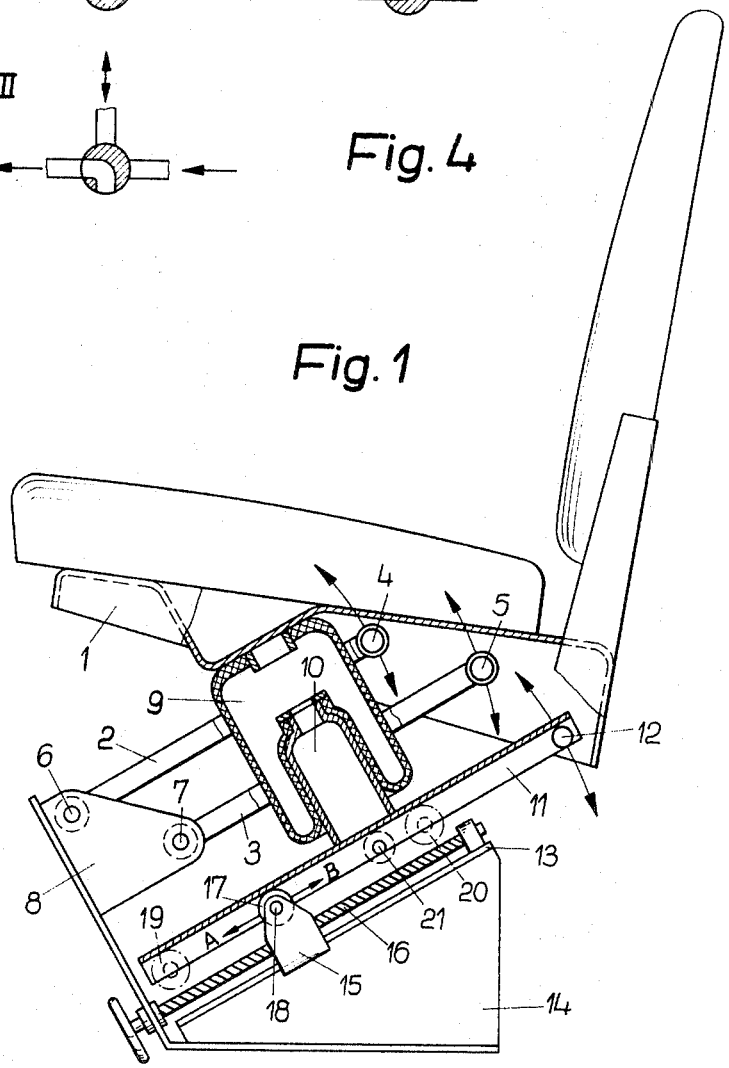
FIG. 1 is a schematic partly sectional side elevation of a vehicle seat and the structure of the invention which is associated therewith.

Referring not to the drawings, the seat illustrated therein includes frame 1 pivotally connected with two pairs of links 2 and 3 which form parts of a parallelogram linkage, as illustrated most clearly in FIG. 1. These swingable links 2 and 3 of the parallelogram linkage are pivotally connected at their right ends, as viewed in FIG. 1, to pivots 4 and 5 carried by the seat frame 1, while at their opposed ends the links 2 and 3 are pivoted to pivots 6 and 7 carried by a suitable block or other support 8. Thus, during swinging the the seat up and down the pivots 4 and 5 will describe parts of circles, as indicated in FIG. 1.

An air-spring means is operatively connected with the seat, and in particular to the frame 1 thereof, and this air-spring means in the illustrated example includes a hollow flexible airtight bag 9 fixed in a fluidtight manner at one end wall to the frame 1 in the manner shown most clearly in FIG. 1 and fixed at its opposed end to a piston 10 of the air-spring means. This opposite end wall of the flexible airtight bag 9 drapes itself over the piston 10 to a greater or lesser extent during movement of the piston 10 toward and away from the frame 1 while decreasing and increasing the interior volume of the bag 9 of the air-spring means 9, 10.

An adjusting means is provided for adjusting the natural frequency of the air-spring means, and this adjusting means includes a swing-lever 11 which is swingable on a pivot 12 fixed to the frame 1 so that the swing-lever 11 of the adjusting means is pivotally connected in this way to the seat. It will be noted, particularly from FIG. 2, that the piston 10 is fixed, as by welding, to the swing-lever 11 at a location spaced from the pivot 12 by the distance $a$ so that this distance $a$ forms a first lever arm.

Figure 2:
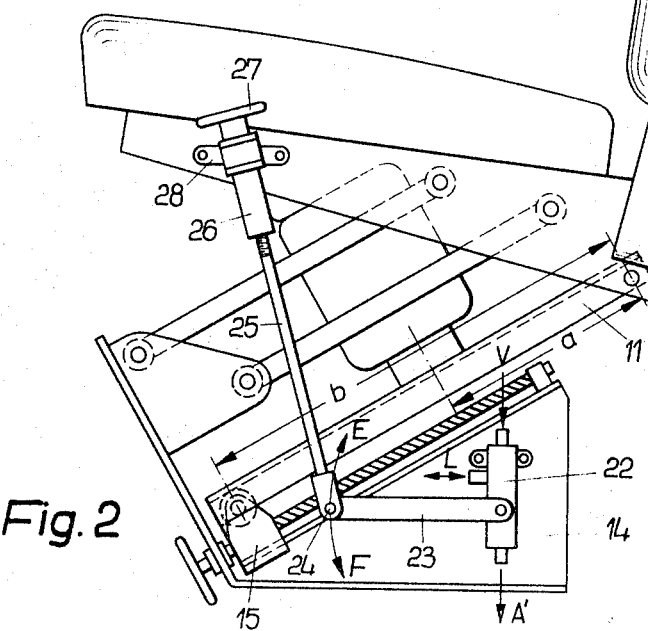
FIG. 2 shows the seat together with the structure for adjusting the elevation thereof.

The means for adjusting the natural frequency of the air-spring means 9, 10 also includes a device for adjusting the location of a fulcrum for the swing-lever 11 along the latter at a selected distance from the pivot 12 so as to determine a second lever arm b, also indicated in FIG. 2. The ratio a/b of the first lever arm to the second lever arm will determine the natural frequency of the air-spring means.

The device for adjusting the location of the fulcrum includes a slide block 15 guided for sliding movement along a guide 13. For example, this guide 13 may take the form of laterally extending ribs projecting from a substantially rigid supporting plate assembly 14 or the like, these ribs being received in mating grooves formed in the slide-block 15 so that the latter can slide up and down along the inclined ribs 13 which extend in a direction generally parallel to the swing-lever 11.

In the illustrated example the adjusting device includes a rotary threaded spindle 16 extending through and having a threaded connection with the block 15 while the spindle 16 itself is prevented from moving axially, so that when the spindle 16 is turned, as by manual rotation of the hand wheel shown in FIGS. 1 and 2 at the lower left thereof, the block 15 will be shifted along the lever 11. The lever 11 is in the form of a channel member having a top wall which rests directly against a roller 17 supported for rotary movement by the block 15. For this purpose the block 15 may be formed with a notch at its top end and carries a pin 18 extending across the notch and through a central bore of the roller 17, so that the latter will rotate freely with respect to the block 15.

Thus, with this adjusting means the operator can turn the hand wheel so as to rotate the spindle 16 and thus displace the roller 17 either downwardly toward the left in the direction of the arrow A or upwardly toward the right in the direction of the arrow B, as indicated in FIG. 1. In this way it is possible to determine the length of the lever arm b. The distance between the line of contact of the roller 17 with the lever 11 and the pivot 12 determines the length of the lever arm b. During the up and down swinging movements of the seat, the swing-lever 11 will swing about the line of contact provided by the fulcrum roller 17 so that the pivot 12 will described approximately an arc of a circle. The dot-dash positions 19 and 20 for the roller 17 indicated in FIG. 1, represent the end positions between which it is possible to adjust the location of the roller 17.

Assuming that the roller 17 is in the position 21, indicated in dot-dash lines in FIG. 1, where the axis of the piston 10 extends perpendicularly across the axis of the pin 18, and thus across the fulcrum line of contact between the lever 11 and the roller 17, then during movement of the seat and the lever 11 the location of the piston 10 along its axis will remain unchanged.

If the roller 17 is displaced in the direction of the arrow A, then when the seat moves downwardly in response to receiving the weight of a person sitting thereon, the piston 10 will also move downwardly, in a clockwise direction about the fulcrum as viewed in FIG. 1. When the person leaves the seat the air-spring means will return the parts to their initial position with the air-spring means expanding and the piston 10 moving upwardly at this time. The movement of the seat, or in other words the movement of the top wall of the bag 9 is several times greater than the extent of movement of the piston.

The reverse of these operation takes place in the event that the roller is moved in the direction of the arrow B from the position 21 to the position 20, which is the end position providing the shortest lever arm b. In this latter location, the piston 10 will be raised when an individual deposits himself upon the seat, of course, the piston 10 will lower its elevation when an individual leaves the seat under these conditions.

While the movement of the roller 17 in the direction of the arrow A will in itself provide a softer spring support for the seat, which is to say a lower or smaller naturally frequency for the air-spring means, this effect is intensified by the movement of the piston during compression and release of the spring means, so that as a result of the action of the piston 10 it is possible to maintain the extent of movement of the roller 17 shorter than would otherwise be possible. If the roller is moved in the direction of the arrow B, then the natural frequency becomes higher and the spring support becomes harder. From FIG. 2 where the lever arms a and b are indicated, it is apparent that the ratio a/b will determine the natural frequency.

Referring to FIG. 2, it is to be noted that for the sake of clarity the elevation adjusting mechanism is disclosed only in FIG. 2. It has been omitted from FIG. 1 so as not to confuse the illustration of the structure now illustrated in FIG. 1. The elevation regulating valve 22 is mounted on the stationary supporting structure 14. The elevation adjusting structure includes a valve operating lever 23 which in its horizontal position shown in FIG. 2 maintains the valve 22 closed.

When the seat becomes unloaded, the pivot 24 at the left end of the lever 23 moves upwardly in the direction of the arrow E, so that the compressed air flows out of the air-spring means into the elevation regulating valve 22 at the location L schematically indicated in FIG. 2 and the air will flow out in the direction A shown at the lower right of FIG. 2. This action takes place until the lever 23, and thus the seat also, assume the positions which they had prior to seating of an individual on the seat.

On the other hand, when the seat is loaded, as by an individual seating himself upon the seat, then the pivot 24 will swing downwardly in the direction of the arrow F, so that the compressed air will flow from a supply container of compressed air in the direction of the arrow V through the regulating valve 22 again at the location L in the reverse direction into the air-spring means.

In the event that it is desired to situate the seat at a higher elevation, then the linkage means, which is operatively connected with the valve 22 and which includes the lever 23, is actuated. This linkage means includes a link assembly 25, 26 made up of an elongated rod 25 pivoted at 24 to the lever 23 and threaded at its top end. The threaded top end of the lever 25 is received in the threaded bore of an elongated tubular nut 26 which is rotated by a hand wheel 27 accessible to the individual on the seat. Thus, by turning the nut 26, which cannot move axially, the rod 25 will be threaded further into or further out of the nut so as to regulate in this way the length of the link assembly 25, 26. In this way the elevation of the seat can be statically set. Thus, manual rotation of the handwheel 27 in one direction will raise the seat and in the other direction will lower the seat.

Figure 3:
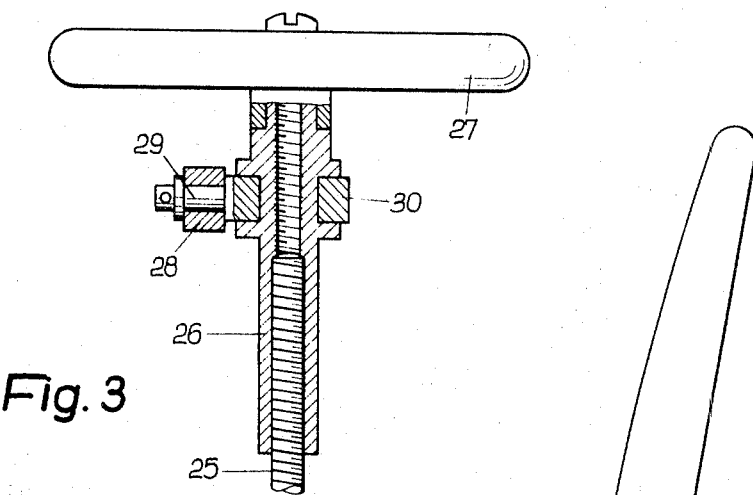
FIG. 3 is a fragmentary sectional elevation, at an enlarged scale as compared to FIG. 2, illustrating part of an adjustable link assembly of the structure of FIG. 2.

As may be seen from FIGS. 2 and 3, a bearing member 28 is fixed directly to the frame of the seat and is formed with a bore which receives a pin 29 projecting radially from a bearing ring 30 which projects into a groove formed at the exterior of the rotary nut 26. Thus, the entire link assembly 25, 26, can swing about the axis of the pin 29 while at the same time the nut 26 can turn in the bearing 30 but cannot move axially with respect thereto.

The elevation adjusting valve 22 is preferably built into the driver's seat of the truck. Of course, it is assumed that such a vehicle, designed to carry commercial freight, will have an installation providing a source of compressed air.

Seats of conventional passenger cars can also have the air-spring type of support of the invention provided that such a vehicle is furnished with a supply container of compressed air which can be filled with compressed air at any filling station. In this latter case, there will be a conduit providing communication between the supply of compressed air and the air-spring means, and this conduit will have a three-way valve built into it for controlling the flow of compressed air.

Thus, assuming that the block 15 is moved in the direction of the arrow A (FIG. 1) for the purpose of providing an increased softness in the spring support, the result is that the seat sinks. It thus becomes necessary to add compressed air to the air-spring means until the initial elevation of the seat is again attained, and for this purpose the three-way valve will have position I indicated in FIG. 4. Thus the compressed air will flow in the direction of the arrow V from the supply and in the direction of the arrow L to the air-spring.

Figure 4:
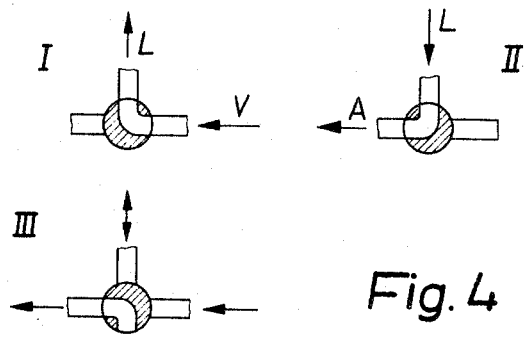
FIG. 4 schematically illustrates various positions of a three-way valve for a vehicle seat which does not have an elevation regulating valve.

In the event that it is desired to provide a harder spring support, then the fulcrum is shifted in the direction of the arrow B, now it becomes necessary to release air from the air-spring, so that the three-way valve is placed by the operator in position II indicated in FIG. 4, where the compressed air flows out of the air-spring in the direction of the arrow L and then out to the atmosphere in the direction of the arrow A.

When the flow of compressed air into or out of the air-spring is terminated, the valve is placed in the closed position III indicated in FIG. 4.

It is to be noted that instead of a threaded spindle type of adjusting device it is possible to use a suitable lever assembly for adjusting the location of the fulcrum along the lever 11.

Buses can also be provided with seats supported with the air-spring assemblies of the invention, and in this case the automatic elevation adjusting valve assembly is provided inasmuch as the occupants of such seats will not have the possibility of manually regulating the elevation of the seat. Benches, such as those used on the bridges of the military and police vehicles, can also be provided in the same way with air-spring supports regulated by automatic elevation regulating valves.

The required shock absorbers are not illustrated in the drawings for the sake of clarity. Inasmuch as the shock absorbers used in the construction of motor vehicles act as shock intensifiers during loading of the assembly by a person seating himself upon the seat, with the air-spring supported seat arrangement of the invention the damping force, upon loading of the seat by a person occupying it, the same should be held as small as possible. Only upon removal of load, when an individual leaves the seat, during return springing of the structure to its initial position should a damping action come into play.

What I claim is:

1. In a vehicle, a support, a seat, air-spring means supporting said seat, said air-spring means having a first part thrusting against the seat and a second part thrusting against the support, and adjustable means interposed between the second part of the air-spring means and the support for adjusting the natural frequency of the air-spring means, said adjustable means comprising a swing lever, means pivotally connecting the swing lever at one end to the seat, the second part of the air-spring means being fixedly connected to the swing lever, a lever supporting fulcrum means disposed on the seat support and adjustably spaced from the pivotal connecting means, means for adjusting the position of the swing lever supporting fulcrum means longitudinally of the swing lever, and means for guiding the seat for movement along a fixed path toward and away from the seat support, said path being unaffected by the adjustment of said swing lever.

2. The combination of claim 1 and wherein a three-way valve means coacts with said air-spring means for adjusting the air content thereof.

3. The combination of claim 1 and wherein said fulcrum means includes a block shiftable by the adjusting device along the swing-lever, and a roller rotatably carried by said block and engaged by said swing lever so that the point of engagement between said roller and swing-lever determines the location of the fulcrum.

4. The combination of claim 3 and wherein the adjusting device includes a rotary threaded spindle having a threaded connection with said block and extending in a direction generally parallel to said swing-lever for moving said block and said roller therewith longitudinally along said lever.

5. The combination of claim 1 and wherein a linkage means is operatively connected with said seat and a valve means is operatively connected with said linkage means to coact with the latter for determining the static elevation of the seat, said linkage means including a link assembly provided with a means for adjusting its length.

6. The combination of claim 5 and wherein said link assembly includes an elongated rod having a threaded end portion and a nut threaded onto said threaded end portion of said rod, the means for adjusting the length of the link assembly including a means operatively connected to the latter for providing relative rotary movement of the nut and rod, one with respect to the other.

7. The combination of claim 6 and wherein a bearing is swingably connected to said seat for free pivotal movement relative thereto and surrounds and carries the nut to support the latter for rotary movement while preventing axial movement thereof, so that upon turning of said nut the length of the link assembly will be adjusted.